US008187067B2

(12) United States Patent
Hamilton, II et al.

(10) Patent No.: US 8,187,067 B2
(45) Date of Patent: May 29, 2012

(54) AUTOMATIC TRANSFORMATION OF INVENTORY ITEMS IN A VIRTUAL UNIVERSE

(75) Inventors: Rick A. Hamilton, II, Charlottesville, VA (US); Brian M. O'Connell, Cary, NC (US); Clifford A. Pickover, Yorktown Heights, NY (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1020 days.

(21) Appl. No.: 12/139,303

(22) Filed: Jun. 13, 2008

(65) Prior Publication Data

US 2009/0312080 A1    Dec. 17, 2009

(51) Int. Cl.
*A63F 9/24* (2006.01)
*A63F 13/00* (2006.01)
*G06F 17/00* (2006.01)
*G06F 19/00* (2006.01)

(52) U.S. Cl. ............................................. 463/9; 463/42
(58) Field of Classification Search ...................... 463/42
See application file for complete search history.

(56) References Cited

U.S. PATENT DOCUMENTS

| 6,009,458 | A   | * | 12/1999 | Hawkins et al. | ............... | 709/203 |
| 6,270,416 | B1  | * | 8/2001  | Komoto | ........................... | 463/43 |
| 6,397,080 | B1  |   | 5/2002  | Viktorsson et al. | | |
| 6,745,236 | B1  | * | 6/2004  | Hawkins et al. | ............... | 709/218 |
| 2004/0163133 | A1 | * | 8/2004 | Ueda et al. | ..................... | 725/133 |
| 2006/0028475 | A1 |   | 2/2006 | Tobias | | |

OTHER PUBLICATIONS

Barr et al., "Changing the Virtual Self, Avatar Transformations in Popular Games," 8 pages, pulled from http://www.mcs.vuw.ac.nz/~chikken/research/papers/cgie2006/TransformingVirtualSelf.pdf.

* cited by examiner

*Primary Examiner* — David L Lewis
*Assistant Examiner* — Reginald Renwick
(74) *Attorney, Agent, or Firm* — William E. Schiesser; Hoffman Warnick LLC

(57) ABSTRACT

An approach that automatically transforms an inventory item of an avatar that is online in a virtual universe without requiring manual changes is described. In one embodiment, there is an avatar locator component configured to locate an avatar that is online in the virtual universe. An inventory item transforming component is configured to automatically transform an inventory item associated with the located avatar that is visual, functional, security or linguistic in nature.

17 Claims, 6 Drawing Sheets

AUTOMATIC TRANSFORMATION OF INVENTORY ITEMS IN A VIRTUAL UNIVERSE

FIELD OF THE INVENTION

This invention relates generally to virtual universes, and more specifically to automatically transforming inventory items associated with an avatar that is online in a virtual universe.

BACKGROUND OF THE INVENTION

Virtual universes or virtual worlds are computer-based simulated environments intended for its users to inhabit and interact via avatars, which are personas or representations of the users of the virtual universes and generally take the form of two-dimensional or three-dimensional human or fantastical representations of a person's self. These types of virtual universes are now most common in massively multiplayer online games such as Second Life which is a trademark of Linden Research in the United States, other countries or both. Avatars in these types of virtual universes, which can number well over a million, have a wide range of business and social experiences.

The inventory items associated with an avatar play an important role in these business and social experiences. An avatar's inventory may contain a wide range of items that the avatar can access and use while on-line in a virtual universe. For example, an avatar's inventory may include professional items such as business reports and other documents, or functional software. In addition, the inventory may contain decorative or entertainment items such as pets, toys, virtual devices, objects for barter, virtual weapons, etc. Currently, users of virtual universes or residents can only make manual changes to enable or disable the use or access of inventory items by using software functionality (e.g., a control panel) provided with the virtual universe. The slow and cumbersome nature of making manual changes to an avatar's inventory may become an impediment to an avatar's ability to experience and enjoy certain business and social experiences within the virtual world.

SUMMARY OF THE INVENTION

In one embodiment, there is a method for automatically transforming an inventory item associated with an avatar that is online in a virtual universe. In this embodiment, the method comprises: locating the avatar in the virtual universe; and automatically transforming an inventory item associated with the avatar according to predetermined inventory item transformation criteria.

In a second embodiment, there is a method for automatically transforming an inventory item of an avatar located in a region of a virtual universe. In this embodiment, the method comprises: assessing the inventory item characteristics associated with the region that the avatar is located; assessing the inventory item characteristics of avatars that are located within the general vicinity of the avatar; automatically transforming an inventory item associated with the avatar according to the assessed inventory item characteristics associated with the region and the assessed inventory item characteristics that are located within the general vicinity of the avatar.

In a third embodiment, there is a computer system for automatically transforming an inventory item of an avatar located in a region of a virtual universe. In this embodiment, the system comprises at least one processing unit and memory operably associated with the at least one processing unit. An automatic inventory item transformation tool is storable in memory and executable by the at least one processing unit. The tool comprises an avatar locator component configured to locate an avatar that is online in the virtual universe. An inventory item transforming component is configured to automatically transform an inventory item associated with the located avatar according to predetermined inventory item transformation criteria.

In a fourth embodiment, there is a computer-readable medium storing computer instructions, which when executed, enables a computer system to automatically transform an inventory item associated with an avatar that is online in a virtual universe. In this embodiment, the computer instructions comprise locating the avatar in the virtual universe; and automatically transforming an inventory item associated with the avatar according to predetermined inventory item transformation criteria.

In a fifth embodiment, there is a method for deploying an automatic inventory item transformation tool for use in a computer system that automatically transforms an inventory item associated with an avatar that is online in a virtual universe. In this embodiment, a computer infrastructure is provided and is operable to locate the avatar in the virtual universe; and automatically transform an inventory item associated with the avatar according to predetermined inventory item transformation criteria.

DETAILED DESCRIPTION OF THE INVENTION

Embodiments of this invention are directed to a technique for automatically transforming inventory items associated with avatars that are online in a virtual universe without requiring manual changes by the user. The embodiments of this invention can automatically transform inventory items that are visual, functional, security or linguistic in nature. In particular, the transformation comprises enabling or disabling these inventory items that are visual, functional, security or linguistic in nature as the avatar moves from one virtual region to another or transforming based on other surrounding environmental factors. More specifically, the transformation is based on the location of the avatar in the virtual universe and characteristics of avatars that are in the general vicinity of the avatar within the virtual universe. In one embodiment, a transformation fee is levied for each transformation of an inventory item characteristic. The transformation fee can be based on the specific transformation performed. For example, distinct and separate fees can be charged for transforming a confidential document that an avatar uses in an office meeting to a publicly available document once the avatar leaves the office meeting. Other fees could be levied for transforming decorative items such as a specialized gothic type of jewelry that an avatar might normally wear to more conservative jewelry that is in his or her inventory as the avatar enters the business meeting. In another embodiment, fees may include a fixed rate for a specific number of transformations, or within a specific time span, or both.

Figure 1:
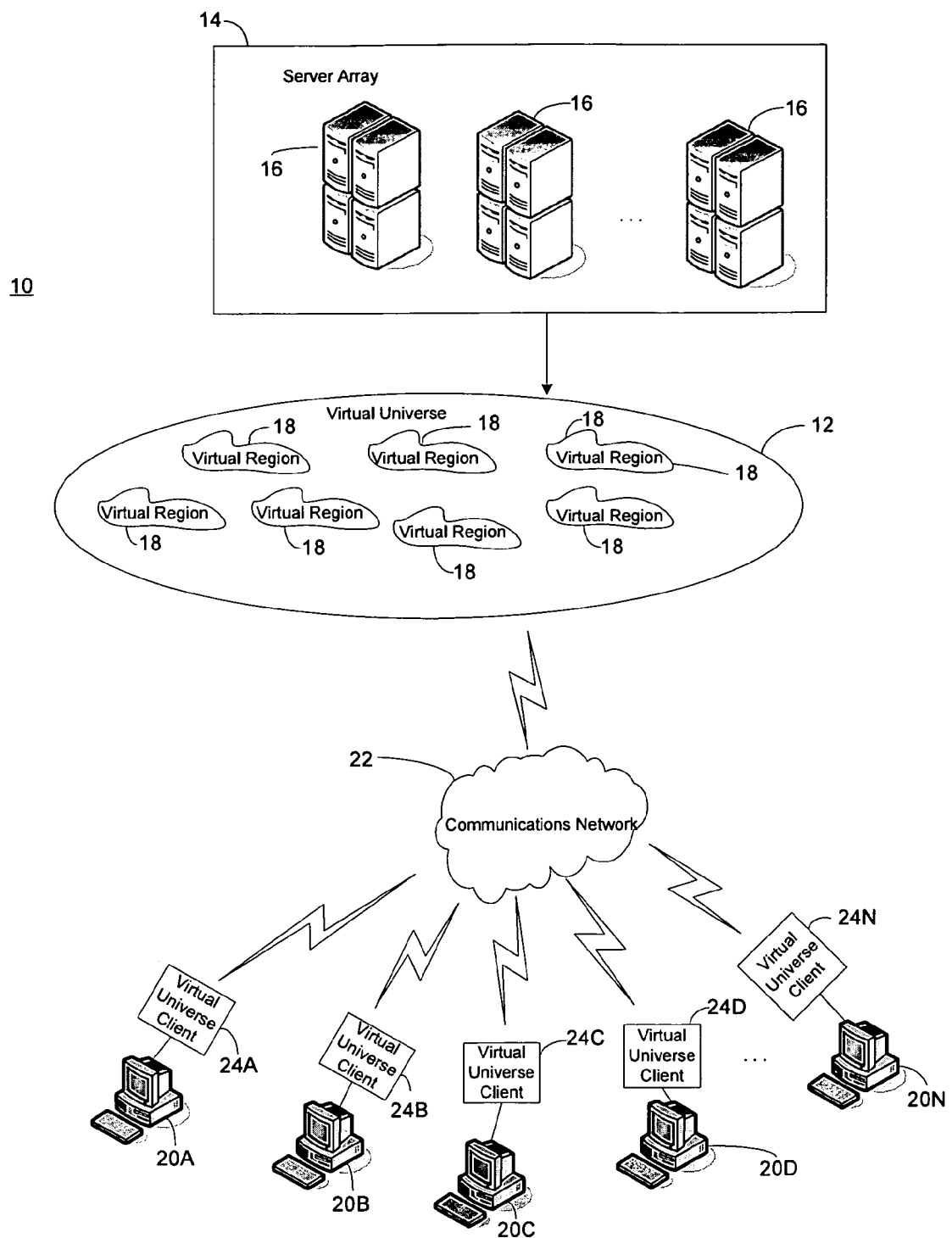
FIG. 1 shows a high-level schematic diagram showing a networking environment for providing a virtual universe according to one embodiment of this invention.

FIG. 1 shows a high-level schematic diagram showing a networking environment 10 for providing a virtual universe 12 according to one embodiment of this invention in which a service for automatically transforming inventory items can be utilized. As shown in FIG. 1, the networking environment 10 comprises a server array or grid 14 comprising a plurality of servers 16 each responsible for managing a sliver of virtual real estate within the virtual universe 12. A virtual universe provided by a typical massively multiplayer online game can employ thousands of servers to manage all of the virtual real estate. The content of the virtual real estate that is managed by each of the servers 16 within the server array 14 shows up in the virtual universe 12 as a virtual region 18. Like the real-world, each virtual region 18 within the virtual universe 12 comprises a living landscape having things such as buildings, stores, clubs, sporting arenas, parks, beaches, cities and towns all created by residents of the universe that are represented by avatars. These examples of items are only illustrative of some things that may be found in a virtual region and are not limiting. Furthermore, the number of virtual regions 18 shown in FIG. 1 is only for illustration purposes and those skilled in the art will recognize that there may be many more regions found in a typical virtual universe, or even only one region in a small virtual universe. FIG. 1 also shows that users operating computers 20A-20N (hereinafter referred generally as 20) interact with the virtual universe 12 through a communication network 22 via virtual universe clients 24A-24N (hereinafter referred generally as 24) that resides in the computers, respectively. Below are further details of the virtual universe 12, server array 14, and virtual universe client 24

Figure 2:
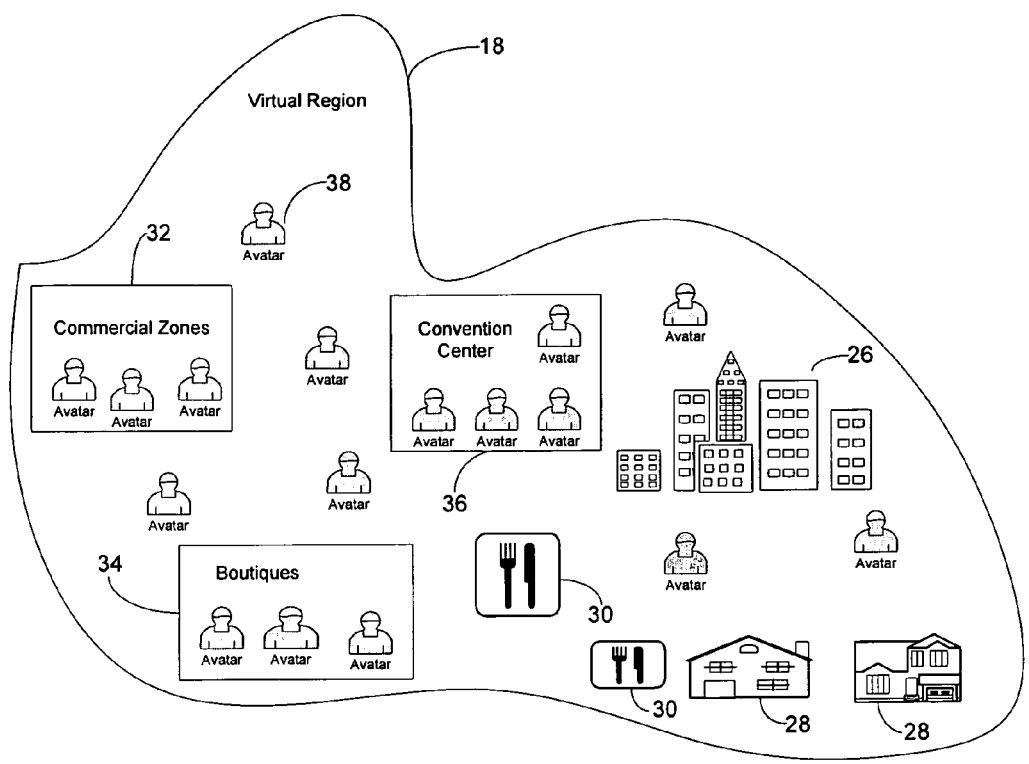
FIG. 2 shows a more detailed view of a virtual region shown in the virtual universe of FIG. 1.

FIG. 2 shows a more detailed view of what one virtual region 18 shown in the virtual universe 12 of FIG. 1 may comprise. As an example, the virtual region 18 shown in FIG. 2 comprises a downtown office center 26, homes 28, restaurants 30, commercial zones 32 and boutiques 34 for shopping and a convention center 36 for meetings and various conventions. Residents or avatars 38, which as mentioned above, are personas or representations of the users of the virtual universe, roam all about the virtual region by walking, driving, flying or even by teleportation or transportation which is essentially moving through space from one point to another, more or less instantaneously. These examples of items in the virtual region 18 shown in FIG. 2 are only illustrative of some things that may be found in a virtual region and those skilled in the art will recognize that these regions can have many more items that can be found in a real-life universe as well as things that do not presently exist in real life.

As an avatar moves from one virtual region 18 to another region it may be desirable for the avatar to access and use inventory items from their inventory. The items or assets within an avatar's inventory may comprise geometric information, textures (graphics files), and effects information. The inventory items may also include information tags. As mentioned above, the avatar's inventory items may take on a wide variety of forms. For example, an avatar's inventory may contain professional items such as business reports and other documents, or functional software. In addition, the inventory could contain decorative or entertainment items such as pets, toys, virtual devices, objects for barter, or virtual weapons.

All of these items which are sometimes referred to as a resident's assets, can be manually enabled (used, invoked, made visible, etc.) or disabled (stopped, put away, made invisible, etc.) by the avatar depending on the business or social setting that the avatar is experiencing. As mentioned above and will be explained below in more detail, the focus of this invention is directed to automatically transforming inventory items of an avatar from one form to another without requiring any manual changes. For example, if an avatar likes to explore the virtual universe with a virtual flashlight then the automatic inventory item transforming tool of this invention can transform the virtual flashlight to another item of similar use that is within the avatar's inventory such as a virtual torch as the avatar approaches a region designated as belonging to a pre-Industrial era. In this example, the transformation is dynamically disabling the flashlight and enabling or accessing the torch from the avatar's inventory.

Figure 3:
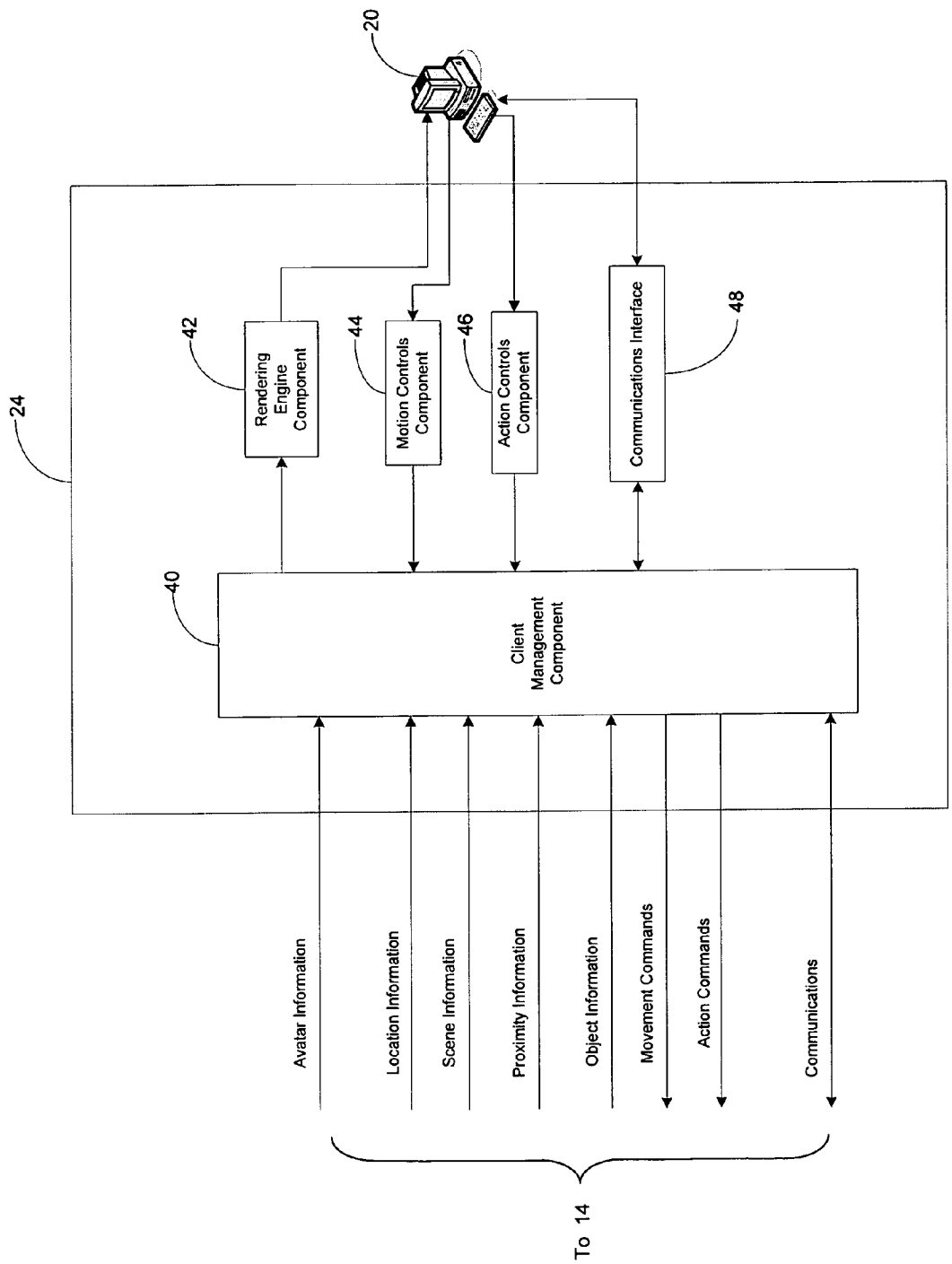
FIG. 3 shows a more detailed view of the virtual universe client shown in FIG. 1.

FIG. 3 shows a more detailed view of the virtual universe client 24 shown in FIG. 1. The virtual universe client 24, which enables users to interact with the virtual universe 12, comprises a client management component 40, which manages actions, movements and communications made by a user through computer 20, and information received from the virtual universe through the server array 14. A rendering engine component 42 enables the user of the computer 20 to visualize his or her avatar within the surroundings of the particular region of the virtual universe 12 that it is presently located. A motion controls component 44 enables the user to make movements through the virtual universe. In one embodiment, movements through the virtual universe can include for example, gestures, postures, walking, running, driving, flying, etc. An action controls component 46 enables the user to perform actions in the virtual universe such as buying items for his or her avatar or even for their real-life selves, building homes, planting gardens, etc., as well as changing the appearance of their avatar. These actions are only illustrative of some possible actions that a user can perform in the virtual universe and are not limiting of the many possible actions that can be performed. A communications interface 48 enables a user to communicate with other users of the virtual universe 12 through modalities such as chatting, instant messaging, gesturing, talking and electronic mail (e-mail).

FIG. 3 shows the various types of information received by the client management component 40 from the virtual universe through the server array 14. In particular, the client management component 40 receives avatar information about the avatars that are in proximity to the user's avatar. In addition, the client management component 40 receives location information about the area that the user's avatar is near (e.g., what region or land he or she is in) as well as scene information (e.g., what the avatar sees). The client management component 40 also receives proximity information which contains information on what the user's avatar is near and object information which is information that can be obtained by one's senses (e.g., touch, taste, smell, etc.,) and what actions are possible for nearby objects (e.g., invoking, pushing, picking up, etc.). FIG. 3 also shows the movement commands and action commands that are generated by the user are sent to the server array via the client management component 40, as well as the communications that can be sent to the users of other avatars within the virtual universe.

Figure 4:
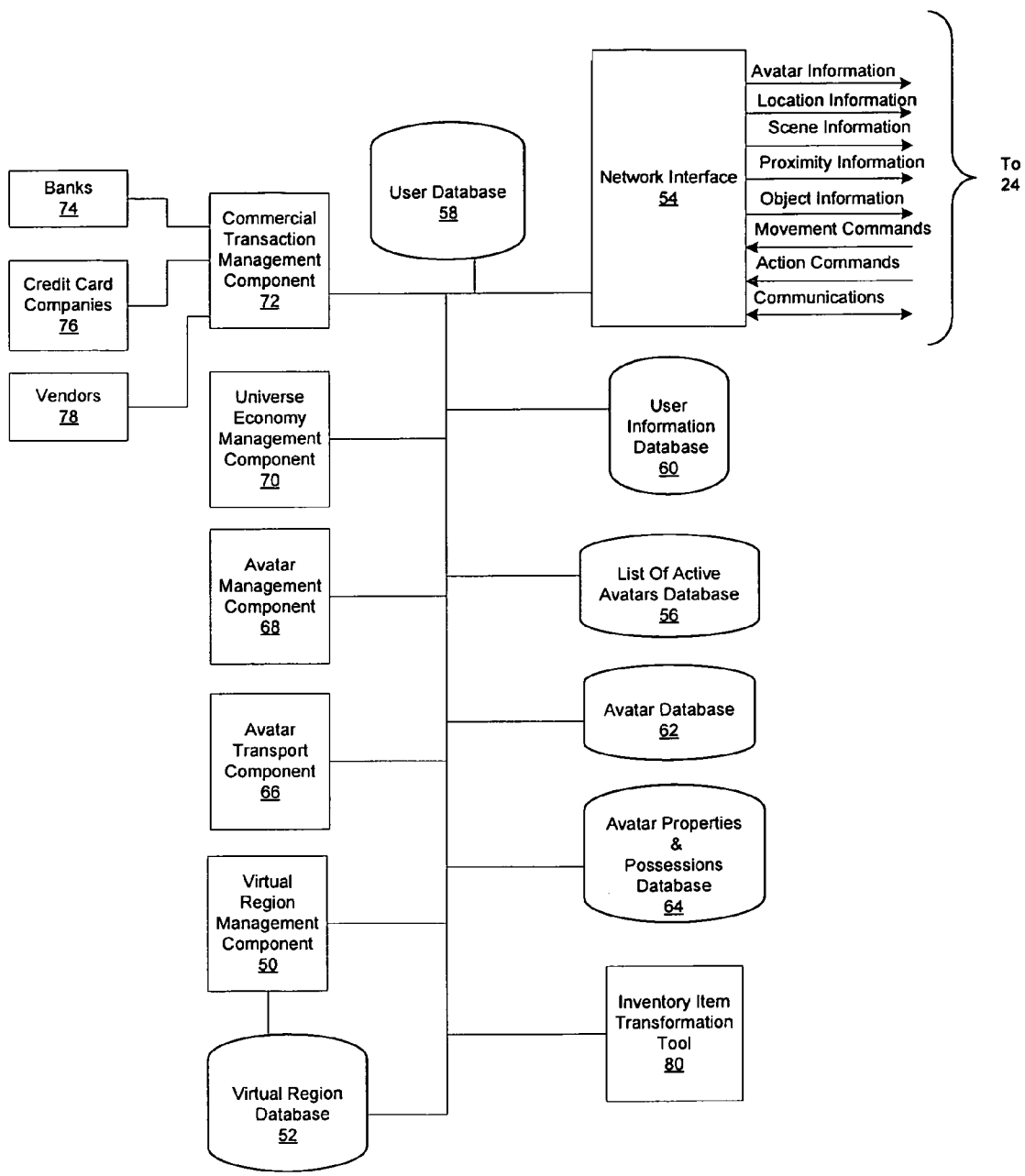
FIG. 4 shows a more detailed view of some of the functionalities provided by the server array shown in FIG. 1.

FIG. 4 shows a more detailed view of some of the functionalities provided by the server array 14 shown in FIG. 1. In particular, FIG. 4 shows a virtual region management component 50 that manages a virtual region within the virtual universe. In particular, the virtual region management component 50 manages what happens in a particular region such as the type of landscape in that region, the number of homes, commercial zones, boutiques, streets, parks, restaurants, etc. For example, the virtual region management component 50 would allow the owner of a particular region or establishment within the region to specify requirements for entering or remaining within the region that could potentially affect certain avatar characteristics. In addition, the virtual region management component 50 would allow the owner of a particular region or establishment to provide a textual description that describes the area in more detail so that the avatars can ascertain if there will be a potential effect on their use of specific inventory items within that region. Those skilled in the art will recognize that the virtual region management component 50 can manage many other facets within the virtual region.

A virtual region database 52 stores information on all of the specifics in the virtual region 18 that the virtual region management component 50 is managing. In one embodiment, for very large virtual universes, one server 16 may be responsible for managing one particular virtual region 18 within the universe. In other embodiments, it is possible that one server 16 may be responsible for handling one particular land within the virtual region 18.

An automatic inventory item transformation tool 80 automatically transforms inventory items that are visual, functional, security or linguistic in nature. In particular, the automatic inventory item transformation tool 80 is configured to enable or disable these inventory items that are visual, functional, security or linguistic in nature as the avatar moves from one virtual region to another or transform based on other surrounding environmental factors such as the location of the avatar in the virtual universe and characteristics of avatars that are in the general vicinity of the avatar within the virtual universe. Below is a more detailed discussion of the automatic inventory item transformation tool 80 and how it performs the above-mentioned functions.

FIG. 4 shows a network interface 54 that enables the server array 14 to interact with the virtual universe client 24 residing on computer 20. In particular, the network interface 54 communicates avatar, location, scene, proximity and object information to the user through the virtual universe client 24 and receives movement and action commands as well as communications from the user via the universe client.

As shown in FIG. 4, there are several different databases for storing information. In particular, database 56 contains a list of all the avatars that are online in the virtual universe 12. Databases 58 and 60 contain information on the actual human users of the virtual universe 12. In one embodiment, database 58 contains general information on the users such as names, addresses, interests, ages, etc., while database 60 contains more private information on the users such as email addresses, billing information (e.g., credit card information) for taking part in transactions. Databases 62 and 64 contain information on the avatars of the users that reside in the virtual universe 12. In one embodiment, database 62 contains information such as all of the avatars that a user may have, the profile of each avatar, avatar characteristics (e.g., appearance, voice and movement features) while database 64 contains an inventory listing properties and possessions that each avatar owns such as hair pieces, weapons, jewelry, houses, cars, sporting equipment, appearance, attire, etc. As virtual universes become more mainstream within a business setting, it is conceivable that users will want to have public and private inventories for their avatar in order to protect unwanted invention of confidential and proprietary information. Therefore, in one embodiment, the database 62 may contain public and private inventories in order to account for various business and social encounters that need to be shielded from unauthorized parties. Those skilled in the art will recognize that databases 58-64 may contain additional information if desired. Although the above information is shown in FIG. 4 as being stored in databases, those skilled in the art will recognize that other means of storing information can be utilized.

An avatar transport component 66 enables users to transport, which as mentioned above, allows avatars to transport through space from one point to another point, instantaneously. As a result, an avatar could for example travel from a business region to an entertainment region to hear a concert. Moving from one point or virtual region to another point could ultimately affect the inventory items that an avatar could use in a particular location. For example, if the avatar was leaving work from the business district with some proprietary information then the transformation tool of this invention could transform the proprietary information to a newspaper. In this example, well-known encryption/decryption techniques can be used in the transformation of documentation.

An avatar management component 68 keeps track of what online avatars are doing while in the virtual universe. For example, the avatar management component 68 can track where the avatar presently is in the virtual universe, what activities it is performing or has recently performed. An illustrative but non-exhaustive list of activities can include shopping, eating, talking, recreating, etc.

Because a typical virtual universe has a vibrant economy, the server array 14 has functionalities that are configured to manage the economy. In particular, a universe economy management component 70 manages transactions that occur within the virtual universe between avatars. In one embodiment, the virtual universe 12 will have their own currency that users pay for with real-life money. The users can then take part in commercial transactions for their avatars through the universe economy management component 70. For example, an avatar might want to pay for a service that provides this automatic inventory item transformation. In this case, the avatar would make the purchase of this service using the virtual universe currency. In some instances, the user may want to take part in a commercial transaction that benefits him or her and not their avatar. In this case, a commercial transaction management component 72 allows the user to participate in the transaction. For example, while walking around a commercial zone, an avatar may see a pair of shoes that he or she would like for themselves and not their avatar. In order to fulfill this type of transaction and others similarly related, the commercial transaction management component 72 interacts with banks 74, credit card companies 76 and vendors 78.

Although not expressly shown in FIG. 4, all of the components shown in the figure are configured to interact with each other. The components that are shown as being interconnected are illustrated in that manner to convey the close interactions that exist between these components such as the banks 74, credit card companies 76, and vendors with the commercial transaction management component 72.

Figure 5:
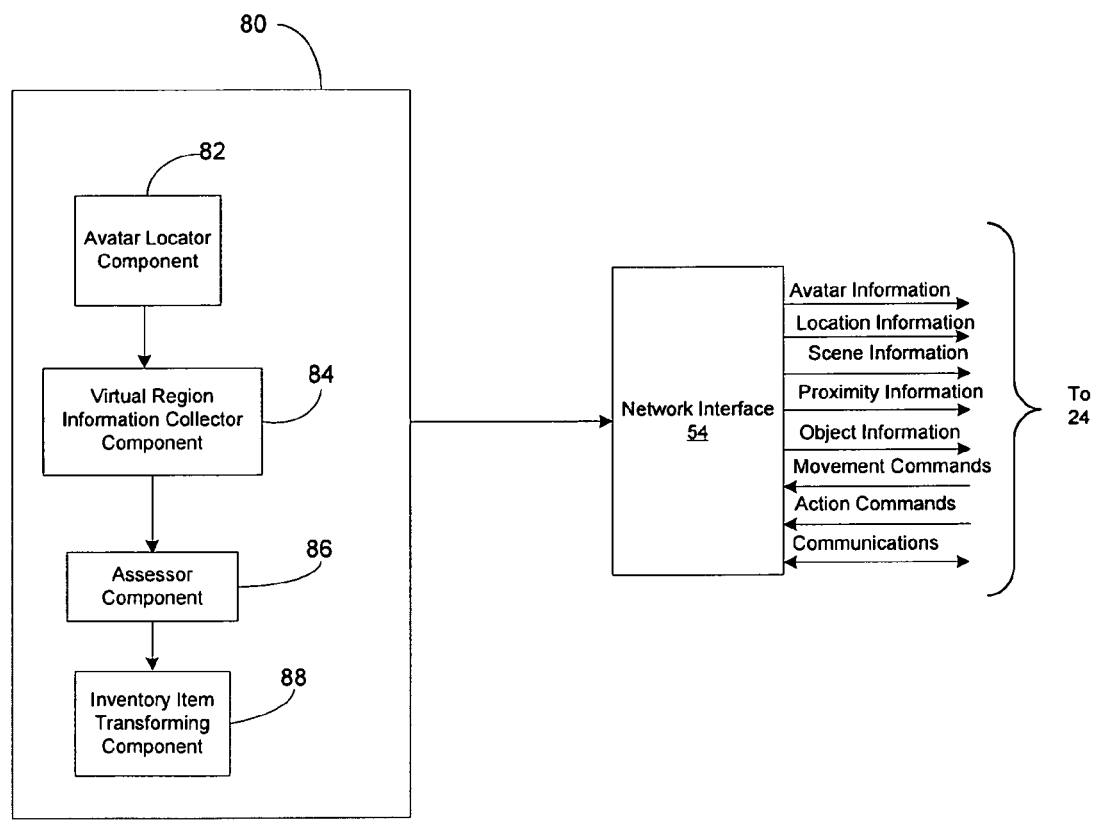
FIG. 5 shows an automatic inventory item transformation tool according to one embodiment of this invention that operates in the environment shown in FIG. 1.

FIG. 5 shows a more detailed view of the automatic inventory item transformation tool 80. As mentioned above, the automatic inventory item transformation tool 80 provides the capability to automatically transform inventory items of an avatar. As shown in FIG. 5, in this embodiment, the automatic inventory item transformation tool 80 resides on the same computer system as the server 14 and communicates directly to the virtual universe and its residents via the virtual universe client 24. In other embodiments, the automatic inventory item transformation tool 80 might reside on the same computers as the virtual universe client 24, or reside on separate computers in direct communication with the virtual universe servers 16 and virtual universe clients 24.

Referring back to FIG. 5, the automatic inventory item transformation tool 80 comprises an avatar locator component 82 that monitors the location of avatars that are online in the virtual universe. The avatar locator component 82 is also configured to determine what virtual regions are within close proximity to the avatar. As used herein, being in close proximity can mean within a specific predetermined distance of the located avatar, such as within virtual visual distance or within sufficient distance to establish local avatar communications.

A virtual region information collector component 84 collects information that relates to the region that an avatar is in or within close proximity. For example, the virtual region information collector component 84 is configured to collect information such as what business, activities, interactions, etc., occur in a particular virtual region and if there are special requirements that have been specified by the owner of the region for entering or remaining in the region that would affect the use of certain inventory items that may be in the possession of an avatar. In addition, the virtual region information collector component 84 is configured to obtain any textual information that describes the business, activities, interactions, etc., that occur in a particular virtual region as provided by the owner or resident in charge of that region or land that would affect the use of certain inventory items. In one embodiment, the virtual region information collector component 84 queries the region to obtain any requirements or textual descriptions that are provided in conjunction with the particular region or land.

Other information collected by the virtual region information collector component 84 includes information on the avatars including their characteristics. For example, the virtual region information collector component 84 can collect information on avatars that are in close proximity to an avatar of interest. In one embodiment, the virtual region information collector component 84 can determine what accoutrements other avatars in the general vicinity are wearing by using flags or tags that indicate certain characteristics. For example, consider visual or appearance inventory item characteristics such as a hair piece. In this example, each hair piece that an avatar possesses can be set to a particular flag or tagged with a particular tag. A bit 0 could represent a business hair piece (e.g., a short and tight hairstyle); a bit 1 could represent a casual hair piece (e.g., a longer hairstyle with a ponytail); while a bit 2 could represent a leisure hair piece (e.g., a mohawk hairstyle). Other bits could be used to designate even more variations of hair pieces. The virtual region information collector component 84 could then collect this appearance metadata from the avatar. In another embodiment, the virtual region information collector component 84 can gather data that pertains to the type of clothing that avatars are wearing by using artificial intelligence processing techniques such as pattern recognition. These above mentioned embodiments could be used to collect information associated with other avatars in the vicinity such as language spoken, including the dialect, accent, speed of speech as well as movement characteristics including postures and gestures. Furthermore, the virtual region information collector component 84 can collect other characteristics on the avatars such as interests, persona, age, interactions, etc.

Referring back to FIG. 5, the automatic inventory item transformation tool 80 further comprises an assessor component 86 configured to assess the location information and avatar characteristic information collected by the virtual region information collector component 84. In particular, the assessor component 86 assesses the inventory item characteristics associated with the location in the virtual universe that the avatar is located and the inventory item characteristics associated with other avatars that are in the general vicinity of the avatar. In one embodiment, for inventory item characteristics associated with the location of the avatar, the assessment will be clear if the owner of the virtual region has specified a requirement for entering the region that affects what inventory items an avatar can access. If there is only a textual description, then the assessor component has to determine from the description whether this will affect the inventory item characteristics of the avatar. For example, if the virtual region was a music hall and the description stated that the music hall was used only for operas, orchestras, symphonies, then the assessor component 86 could ascertain that the avatar needs to be clean-shaven, dressed in formal clothing attire and wearing no tattoos.

With regard to inventory item characteristics that are associated with other avatars that are located in the same general vicinity (e.g., a predetermined vicinity) as the avatar of interest, in one embodiment the assessor component 86 can perform a statistical analysis on these inventory item characteristics to determine what features that affect an avatar's inventory may be necessary to be in the same vicinity as these other avatars. For example, if 60% of the avatars that are within a 30 foot radius of the avatar of interest are in bathing suits, then the assessor component 86 will ascertain that the avatar should be in bathing suit. In another example that involves security characteristics of inventory items, if 60% of the avatars within 15 feet of the located avatar are making use of encrypted documents, then the automatic inventory item transformation tool 80 will encrypt the avatar's documents. As another example, if an avatar is near other avatars from different companies, password protection of sensitive material may be warranted.

This form of statistical analysis can be used to determine other avatar characteristics of similarly located avatars such as voice (i.e., audio) and movement characteristics. For example, if a document or sign is in English, but 95% of the nearby avatars are German, and the located avatar is on a German region or land, then the automatic inventory item transformation tool 80 makes a translation. In this embodiment, well-known speech and language recognition techniques can be used to implement these features.

In another embodiment, the assessor component 86 is configured to analyze the metadata associated with the avatars in the general vicinity of the avatar of interest to determine what inventory item characteristics may be affected. For example, if a majority of avatars within a 40 foot radius of the avatar of interest are tagged with a bit representative of formal wear, then the assessor component 86 would determine from that metadata that formal wear is the proper attire at this particular region. In another embodiment, the assessor component 86 is configured to use artificial intelligence data processing techniques such as pattern recognition to determine what other avatars in the same vicinity are wearing. If the other avatars are wearing white robes then the assessor component 86 could learn to determine that the avatars are at a martial arts gym and that the avatar would need to put on his or her robe. In these examples, the automatic inventory item transformation tool 80 would then go to an avatar's inventory of items make the appropriate transformation to conform to the other avatars.

In another embodiment, the assessor component 86 is configured to scan the inventory items of an avatar from the database 64 to determine whether a transformation of an inventory item is necessary. For example, in the scenario where an avatar enters a business meeting carrying a suitcase of documents, the assessor component can then scan these documents which are listed in the avatar's inventory and determine whether the documents need to be transformed to another form, encrypted/decrypted or labeled with a specialized setting based on any predetermined inventory item transformation criteria.

An inventory item transforming component 88 is configured to automatically transform the inventory items of the avatar if predetermined transformation criteria have been met as determined by the assessor component 86. In one embodiment, the predetermined transformation criteria comprise location of the avatar in the virtual universe and the inventory item characteristics of the other avatars that are in the general vicinity of an avatar of interest. In one embodiment, before the inventory item transforming component 88 automatically transforms the inventory items, the component has to determine whether the avatar has granted permission to have an automatic transformation occur. If the avatar has not agreed to permit automatic transformations, then the inventory item transforming component 88 would not transform the inventory item. Typically, this type of information could be stored in the avatar database 62 (FIG. 4) in the profile set up for the avatar. If the avatar has agreed to automatic transformations of inventory items, then the inventory item transforming component 88 could retrieve the certain items from their inventory which is stored in the avatar properties and possession database 64.

In other embodiments where the avatar has multiple profiles for their inventory items, then it is possible that the inventory item transforming component 88 could automatically transform or morph the inventory item to one of a multiple of possibilities. For example, an item may optionally change from one functional capability to a multiple of possible functional capabilities (e.g., software scripts that enable a specified object to perform more than one function). In particular, a briefcase may hold more than one functional capability besides holding information, such as being a video camera, a tape recorder or stereo. Thus, if an avatar enters a business meeting, the briefcase can now provide tape recording capabilities if it has been determined as being necessary by the assessor component 86 per the predetermined transformation criteria. Therefore, the inventory item transforming component 88 could make this transformation.

In another embodiment of this invention, the automatic inventory item transformation tool 80 is used as a service to charge fees for each automatic transformation invoked, the degree and kind of transformation invoked (e.g., changing an appearance related inventory item as opposed to only a change to information related inventory items. In this embodiment, the provider of the virtual universe or a third party service provider could offer this inventory item transformation as a service by performing the functionalities described herein on a subscription and/or fee basis. In this case, the provider of the virtual universe or the third party service provider can create, deploy, maintain, support, etc., the automatic inventory item transformation tool 80 that performs the processes described in the invention. In return, the virtual universe or the third party service provider can receive payment from the virtual universe residents via the universe economy management component 70 and the commercial transaction management component 72.

In still another embodiment, the methodologies disclosed herein can be used within a computer system to automatically transform inventory items of avatars that are online in a virtual universe. In this case, the automatic inventory item transformation tool 80 can be provided and one or more systems for performing the processes described in the invention can be obtained and deployed to a computer infrastructure. To this extent, the deployment can comprise one or more of (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the invention.

Figure 6:
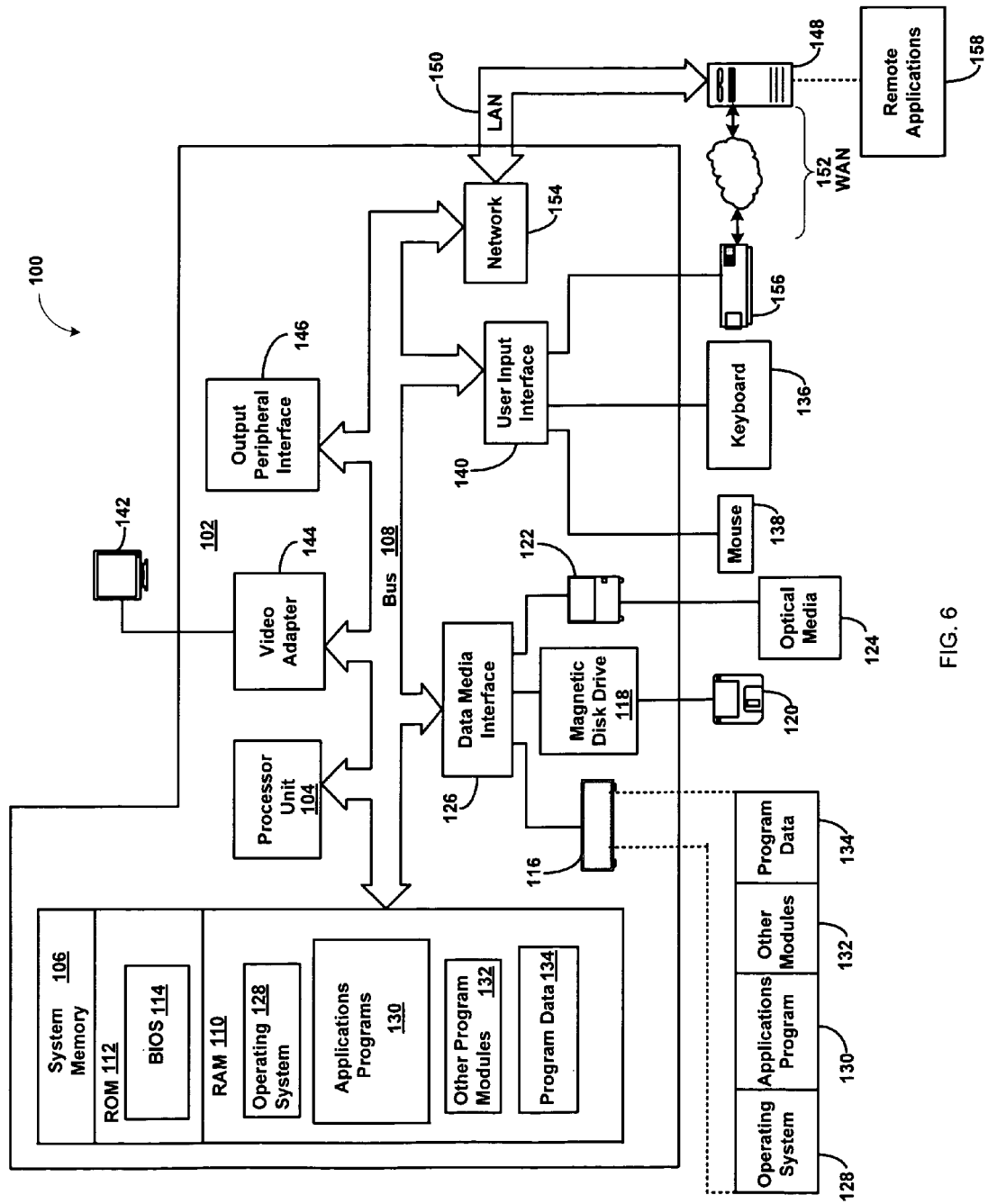
FIG. 6 shows a schematic of an exemplary computing environment in which elements of the networking environment shown in FIG. 1 may operate.

FIG. 6 shows a schematic of an exemplary computing environment in which elements of the networking environment shown in FIG. 1 may operate. The exemplary computing environment 100 is only one example of a suitable computing environment and is not intended to suggest any limitation as to the scope of use or functionality of the approach described herein. Neither should the computing environment 100 be interpreted as having any dependency or requirement relating to any one or combination of components illustrated in FIG. 6.

In the computing environment 100 there is a computer 102 which is operational with numerous other general purpose or special purpose computing system environments or configurations. Examples of well known computing systems, environments, and/or configurations that may be suitable for use with an exemplary computer 102 include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary computer 102 may be described in the general context of computer-executable instructions, such as program modules, being executed by a computer. Generally, program modules include routines, programs, objects, components, logic, data structures, and so on, that performs particular tasks or implements particular abstract data types. The exemplary computer 102 may be practiced in distributed computing environments where tasks are performed by remote processing devices that are linked through a communications network. In a distributed computing environment, program modules may be located in both local and remote computer storage media including memory storage devices.

As shown in FIG. 6, the computer 102 in the computing environment 100 is shown in the form of a general-purpose computing device. The components of computer 102 may include, but are not limited to, one or more processors or processing units 104, a system memory 106, and a bus 108 that couples various system components including the system memory 106 to the processor 104.

Bus 108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 102 typically includes a variety of computer readable media. Such media may be any available media that is accessible by computer 102, and it includes both volatile and non-volatile media, removable and non-removable media.

In FIG. 6, the system memory 106 includes computer readable media in the form of volatile memory, such as random access memory (RAM) 110, and/or non-volatile memory, such as ROM 112. A BIOS 114 containing the basic routines that help to transfer information between elements within computer 102, such as during start-up, is stored in ROM 112. RAM 110 typically contains data and/or program modules that are immediately accessible to and/or presently operated on by processor 104.

Computer 102 may further include other removable/non-removable, volatile/non-volatile computer storage media. By way of example only, FIG. 6 illustrates a hard disk drive 116 for reading from and writing to a non-removable, non-volatile magnetic media (not shown and typically called a "hard drive"), a magnetic disk drive 118 for reading from and writing to a removable, non-volatile magnetic disk 120 (e.g., a "floppy disk"), and an optical disk drive 122 for reading from or writing to a removable, non-volatile optical disk 124 such as a CD-ROM, DVD-ROM or other optical media. The hard disk drive 116, magnetic disk drive 118, and optical disk drive 122 are each connected to bus 108 by one or more data media interfaces 126.

The drives and their associated computer-readable media provide nonvolatile storage of computer readable instructions, data structures, program modules, and other data for computer 102. Although the exemplary environment described herein employs a hard disk 116, a removable magnetic disk 118 and a removable optical disk 122, it should be appreciated by those skilled in the art that other types of computer readable media which can store data that is accessible by a computer, such as magnetic cassettes, flash memory cards, digital video disks, RAMs, ROM, and the like, may also be used in the exemplary operating environment.

A number of program modules may be stored on the hard disk 116, magnetic disk 120, optical disk 122, ROM 112, or RAM 110, including, by way of example, and not limitation, an operating system 128, one or more application programs 130, other program modules 132, and program data 134. Each of the operating system 128, one or more application programs 130 other program modules 132, and program data 134 or some combination thereof, may include an implementation of the networking environment 10 of FIG. 1 including the server array 14, the virtual universe client 24 and the automatic inventory item transformation tool 80. In one embodiment, the one or more application programs 130 include components of the automatic inventory item transformation tool 80 such as the avatar locator component 82, virtual region information collector component 84, assessor component 86 and inventory item transforming component 88.

A user may enter commands and information into computer 102 through optional input devices such as a keyboard 136 and a pointing device 138 (such as a "mouse"). Other input devices (not shown) may include a microphone, joystick, game pad, satellite dish, serial port, scanner, camera, or the like. These and other input devices are connected to the processor unit 104 through a user input interface 140 that is coupled to bus 108, but may be connected by other interface and bus structures, such as a parallel port, game port, or a universal serial bus (USB).

An optional monitor 142 or other type of display device is also connected to bus 108 via an interface, such as a video adapter 144. In addition to the monitor, personal computers typically include other peripheral output devices (not shown), such as speakers and printers, which may be connected through output peripheral interface 146.

Computer 102 may operate in a networked environment using logical connections to one or more remote computers, such as a remote server/computer 148. Remote computer 148 may include many or all of the elements and features described herein relative to computer 102.

Logical connections shown in FIG. 6 are a local area network (LAN) 150 and a general wide area network (WAN) 152. Such networking environments are commonplace in offices, enterprise-wide computer networks, intranets, and the Internet. When used in a LAN networking environment, the computer 102 is connected to LAN 150 via network interface or adapter 154. When used in a WAN networking environment, the computer typically includes a modem 156 or other means for establishing communications over the WAN 152. The modem, which may be internal or external, may be connected to the system bus 108 via the user input interface 140 or other appropriate mechanism.

In a networked environment, program modules depicted relative to the personal computer 102, or portions thereof, may be stored in a remote memory storage device. By way of example, and not limitation, FIG. 6 illustrates remote application programs 158 as residing on a memory device of remote computer 148. It will be appreciated that the network connections shown and described are exemplary and other means of establishing a communications link between the computers may be used.

An implementation of an exemplary computer 102 may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided with this invention an approach for automatic inventory item transformation for a virtual universe. While the invention has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the invention.

What is claimed is:

1. A method, performed on a computer system using a processor, for automatically transforming an inventory item associated with an avatar that is online in a virtual universe, comprising, using said processor on said computer system to perform the following:

locating the avatar in the virtual universe; and automatically transforming an inventory item within an inventory associated with the avatar according to predetermined inventory item transformation criteria, the inventory containing a listing of properties and possessions that are for use in the virtual universe and that belong to the avatar, wherein the automatic transforming of the inventory item changes the inventory item to conform with any avatar characteristic requirements associated with being allowed to enter or remain in a location that the avatar is currently in and to conform with the avatar characteristics of a plurality of avatars that are in a general vicinity of the avatar, wherein a statistical analysis is performed on the avatar characteristics associated with the plurality of avatars that are in the general vicinity of the avatar to determine which avatar characteristics may be necessary to enter or remain in this vicinity, the statistical analysis comprises determining a percentage of avatar characteristics that the plurality of avatars in the general vicinity have in common with each other that may be necessary to enter or remain in this vicinity in order to invoke an inventory item change to conform with a common avatar characteristic shared by the plurality of avatars.

2. The method according to claim 1, wherein the inventory item comprises an attribute that is visual, functional, security or linguistic related.

3. The method according to claim 1, further comprising charging an inventory item transformation fee to the avatar for the automatic transformation of the inventory item.

4. The method according to claim 3, wherein the transformation fee is based on the type of transformation performed.

5. A method, performed on a computer system using a processor, for automatically transforming an inventory item of an avatar located in a region of a virtual universe, comprising, using said processor on said computer system to perform the following:

assessing inventory item characteristics associated with the region in which the avatar is located;

assessing inventory item characteristics of a plurality of avatars that are located within the general vicinity of the avatar;

automatically transforming an inventory item within an inventory associated with the avatar according to the assessed inventory item characteristics associated with the region and the assessed inventory item characteristics of the plurality of avatars that are located within a predetermined vicinity of the avatar, the inventory containing a listing of properties and possessions that are for use in the virtual universe and that belong to the avatar, wherein to confirm with any avatar characteristic requirements associated with being allowed to enter or remain in the location that the avatar is currently in and to conform with the avatar characteristics of the plurality of the plurality of avatars that are in the general vicinity of the avatar, wherein a statistical analysis is performed on the avatar characteristics associated with the plurality of avatars that are in the general vicinity of the avatar to determine which avatar characteristics may be necessary to enter or remain in this vicinity, the statistical analysis comprises determining a percentage of avatar characteristics that the plurality of avatars in the general vicinity have in common with each other that may be necessary to enter or remain in this vicinity in order to invoke an inventory item change to conform with a common avatar characteristic shared by the plurality of avatars.

6. The method according to claim 5, wherein the assessing of inventory item characteristics comprises querying the location in the virtual universe that the avatar is located for specified inventory item characteristics for that location.

7. The method according to claim 5, further comprising determining whether the avatar has granted permission for the automatic transformation of the inventory item prior to performing an automatic transformation.

8. The method according to claim 5, wherein the transforming of the inventory item comprises dynamically disabling or enabling the item as the located avatar moves from one virtual region within the virtual universe to another region.

9. A computer system for automatically transforming an inventory item of an avatar located in a region of a virtual universe, comprising:

at least one processing unit;

memory operably associated with the at least one processing unit; and an automatic inventory item transformation tool storable in memory and executable by the at least one processing unit, the tool comprising:

an avatar locator component configured to locate an avatar that is online in the virtual universe; and an inventory item transforming component configured to automatically transform an inventory item within an inventory associated with the located avatar according to predetermined inventory item transformation criteria, the inventory containing a listing of properties and possessions that are for use in the virtual universe and that belong to the avatar, wherein the automatic transforming of the inventory item changes the inventory item to conform with any avatar characteristic requirements associated with being allowed to enter or remain in a location that the avatar is currently in and to conform with the avatar characteristics of a plurality of avatars that are in a general vicinity of the avatar, wherein a statistical analysis is performed on the avatar characteristics associated with the plurality of avatars that are in the general vicinity of the avatar to determine which avatar characteristics may be necessary to enter or remain in this vicinity, the statistical analysis comprises determining a percentage of avatar characteristics that the plurality of avatars in the general vicinity have in common with each other that may be necessary to enter or remain in this vicinity in order to invoke an inventory item change to conform with a common avatar characteristic shared by the plurality of avatars.

10. The automatic inventory item transformation tool according to claim 9, wherein the inventory item comprises an attribute that is visual, functional, security or linguistic related.

11. The automatic inventory item transformation tool according to claim 9, further comprising a virtual region information collector component configured to query the region in the virtual universe that the avatar is located for specified inventory item characteristics that are associated with the location.

12. The automatic inventory item transformation tool according to claim 9, further comprising a transformation transaction component configured to charge a transformation fee to the avatar for the automatic transformation of inventory item characteristics.

13. A non-transitory computer-readable medium storing computer instructions, which when executed, enables a computer system to automatically transform an inventory item associated with an avatar that is online in a virtual universe, the computer instructions comprising:

locating the avatar in the virtual universe; and automatically transforming an inventory item within an inventory associated with the avatar according to predetermined inventory item transformation criteria, the inventory containing a listing of properties and possessions that are for use in the virtual universe and that belong to the avatar, wherein the automatic transforming of the inventory item changes the inventory item to conform with any avatar characteristic requirements associated with being allowed to enter or remain in a location that the avatar is currently in and to conform with the avatar characteristics of the plurality of avatars that are in a general vicinity of the avatar, wherein a statistical analysis is performed on the avatar characteristics associated with the plurality of avatars that are in the general vicinity of the avatar to determine which avatar characteristics may be necessary to enter or remain in this vicinity, the statistical analysis comprises determining a percentage of avatar characteristics that the plurality of avatars in the general vicinity have in common with each other that may be necessary to enter or remain in this vicinity in order to invoke an inventory item change to conform with a common avatar characteristic shared by the plurality of avatars.

14. The computer-readable medium according to claim 13, wherein the inventory item comprises an attribute that is visual, functional, security or linguistic related.

15. The computer-readable medium according to claim 13, further comprising instructions for charging an inventory item transformation fee to the avatar for the automatic transformation of inventory item characteristics.

16. The computer-readable medium according to claim 15, wherein the transformation fee is based on the type of transformation performed.

17. A method for deploying an automatic inventory item transformation tool for use in a computer system that automatically transforms an inventory item associated with an avatar that is online in a virtual universe, comprising:

providing a computer infrastructure operable to:

locate the avatar in the virtual universe; and automatically transform an inventory item within an inventory associated with the avatar according to predetermined inventory item transformation criteria, the inventory containing a listing of properties and possessions that are for use in the virtual universe and that belong to the avatar, wherein the automatic transforming of the inventory item changes the inventory item to conform with any avatar characteristic requirements associated with being allowed to enter or remain in a location that the avatar is currently in and to conform with the avatar characteristics of the plurality of avatars that are in the general vicinity of the avatar, wherein a statistical analysis is performed on the avatar characteristics associated with the plurality of avatars that are in a general vicinity of the avatar to determine which avatar characteristics may be necessary to enter or remain in this vicinity, the statistical analysis comprises determining a percentage of avatar characteristics that the plurality of avatars in the general vicinity have in common with each other that may be necessary to enter or remain in this vicinity in order to invoke an inventory item change to conform with a common avatar characteristic shared by the plurality of avatars.

* * * * *